United States Patent
Hajiaghayi et al.

(10) Patent No.: US 7,933,224 B2
(45) Date of Patent: Apr. 26, 2011

(54) APPROXIMATING NODE-WEIGHTED STEINER NETWORK OF TERMINALS

(75) Inventors: Mohammad Taghi Hajiaghayi, Florham Park, NJ (US); Erik D. Demaine, Cambridge, MA (US); Philip N. Klein, Newton, MA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 169 days.

(21) Appl. No.: 12/276,980

(22) Filed: Nov. 24, 2008

(65) Prior Publication Data

US 2010/0128631 A1    May 27, 2010

(51) Int. Cl.
*H04L 12/28* (2006.01)
(52) U.S. Cl. ........................................ 370/254
(58) Field of Classification Search ............. 716/1, 2, 716/6, 7, 9, 11–14; 370/254
See application file for complete search history.

(56) References Cited

U.S. PATENT DOCUMENTS

| | | | |
|---|---|---|---|
| 2001/0018759 A1* | 8/2001 | Andreev et al. | 716/7 |
| 2005/0134587 A1* | 6/2005 | Geiger et al. | 345/423 |

* cited by examiner

*Primary Examiner* — Man Phan
*Assistant Examiner* — Nourali Mansoury
(74) *Attorney, Agent, or Firm* — Hope Baldauff Hartman, LLC

(57) ABSTRACT

According to one method for approximating a network of terminals, a graph comprising nodes and edges connecting at least some of the nodes is received. The nodes include terminals and non-terminal nodes. The non-terminal nodes are each associated with a weight. The terminals are each initialized to a value. The values of the terminals are incremented by a given amount until the values of the terminals reach a sufficient amount to acquire at least one of the non-terminal nodes that connects at least two of the terminals based on the weight of the at least one of the non-terminal nodes. Upon the values of the terminals reaching the sufficient amount, the at least one of the non-terminal nodes and the edges connecting the at least one of the non-terminal nodes to the at least two of the terminals are acquired to form a connected component in the network of terminals.

17 Claims, 6 Drawing Sheets

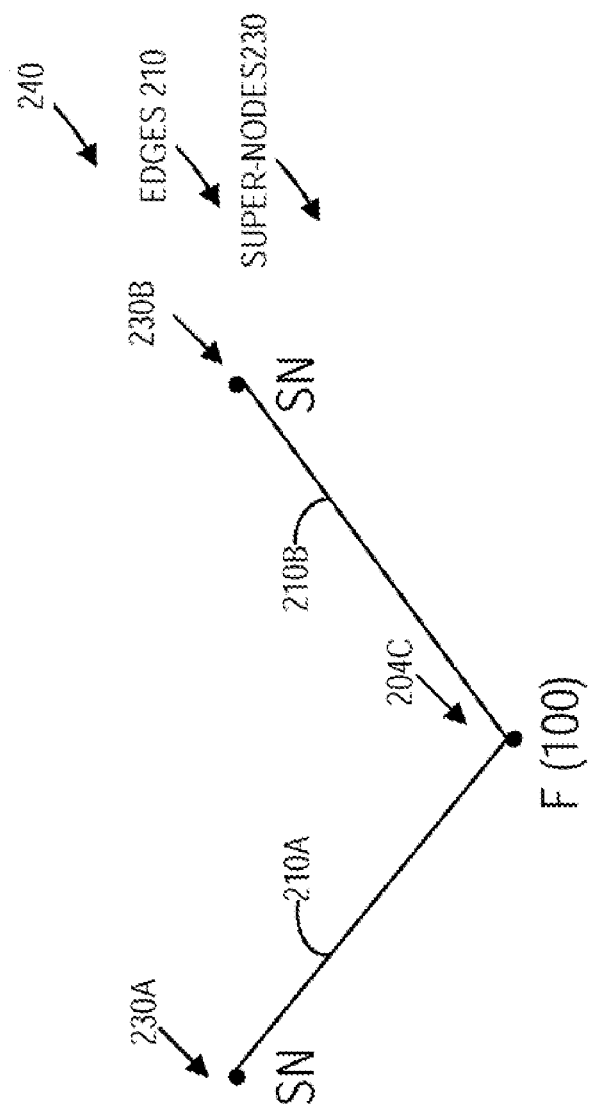

US 7,933,224 B2

APPROXIMATING NODE-WEIGHTED STEINER NETWORK OF TERMINALS

BACKGROUND

The present disclosure generally relates to the field of graph theory and, more particularly, to approximating a lowest cost subgraph within a graph.

A graph is a representation of a set of nodes connected by edges. Graphs may be utilized to model a variety of different real-life network design problems, such as Very Large Scale Integration ("VLSI") wire routing, communications network design, and facility location analysis. For example, the nodes in the graph may represent network equipment, such as routers and switches, and the edges in the graph may represent network connections, such as the physical cable that connects the routers and switches.

A number of different graph problems are directed to determining optimal graphs or optimal subsets of graphs according to certain criteria. One common type of graph problem is known as the Steiner tree problem. The Steiner tree problem is commonly defined as follows: given a graph and a subset of nodes (also referred to as terminals) contained in the graph, determine a minimum weight tree that connects all of the terminals. Unlike a minimum spanning tree, which is similarly defined, the Steiner tree may include intermediate nodes and edges that are not in the given graph. In order to determine the minimum weight tree, each node and/or edge in the graph may be assigned a weight. For an edge-weighted Steiner tree, the minimum weight tree minimizes the total edge cost. For a node-weighted Steiner tree, the minimum weight tree minimizes the total node cost.

Planar graphs represent a particular class of graphs in which the edges do not cross. In scenarios where the edges represent underground cable or fiber, the edges are typically planar and rarely, if ever, cross. While a number of different solutions have been proposed for approximating node-weighted Steiner trees, these conventional solutions generally do not address planar graphs.

SUMMARY

Embodiments of the disclosure presented herein include methods, systems, and computer-readable media for approximating a network of terminals. According to one aspect, a method for approximating a network of terminals is provided. According to the method, a graph comprising nodes and edges connecting at least some of the nodes is received. The nodes include terminals and non-terminal nodes. Each of the non-terminal nodes is associated with a weight. Each of the terminals is initialized to a value. The values of the terminals are incremented by a given amount until the values of the terminals reach a sufficient amount to acquire at least one of the non-terminal nodes that connects at least two of the terminals based on the weight of the at least one of the non-terminal nodes. Upon the values of the terminals reaching the sufficient amount, the at least one of the non-terminal nodes and the edges connecting the at least one of the non-terminal nodes to the at least two of the terminals are acquired to form a connected component in the network of terminals.

According to another aspect, a system for approximating a network of terminals is provided. The system includes a memory and a processor functionally coupled to the memory. The memory stores a program containing code for approximating a network of terminals. The processor is responsive to computer-executable instructions contained in the program and operative to receive a graph comprising nodes and edges connecting at least some of the nodes. The nodes include terminals and non-terminal nodes. Each of the non-terminal nodes are associated with a weight. The processor is further responsive to computer-executable instructions contained in the program and operative to initialize each of the terminals to a value and to increment the values of the terminals by a given amount until the values of the terminals reach a sufficient amount to acquire at least one of the non-terminal nodes that connects at least two of the terminals based on the weight of the at least one of the non-terminal nodes. The processor is further responsive to computer-executable instructions contained in the program and operative to acquire, upon the values of the terminals reaching the sufficient amount, the at least one of the non-terminal nodes and the edges connecting the at least one of the non-terminal nodes to the at least two of the terminals to form a connected component in the network of terminals.

According to yet another aspect, a computer-readable medium having instructions stored thereon for execution by a processor to perform a method for approximating a network of terminals is provided. According to the method, a graph comprising nodes and edges connecting at least some of the nodes is received. The nodes include terminals and non-terminal nodes. Each of the non-terminal nodes is associated with a weight. Each of the terminals is initialized to a value. The values of the terminals are incremented by a given amount until the values of the terminals reach a sufficient amount to acquire at least one of the non-terminal nodes that connects at least two of the terminals based on the weight of the at least one of the non-terminal nodes. Upon the values of the terminals reaching the sufficient amount, the at least one of the non-terminal nodes and the edges connecting the at least one of the non-terminal nodes to the at least two of the terminals are acquired to form a connected component in the network of terminals.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIG. 2C is a diagram of a network of terminals generated from the graphs of FIGS. 2A and 2B.

DETAILED DESCRIPTION

The following detailed description is directed to approximating a network of terminals in a graph based on node weights. The graph may be planar or near-planar. One type of network of terminals is a node-weighted Steiner tree. In an illustrative example, the graph may be a telecommunications network containing a number of routers that serve as nodes. In this case, customer devices may serve as the terminals. One exemplary application of the embodiments described herein is connecting the customers to a common sink with a minimum total router cost.

Other networks in which only a subset of terminals are connected may be similarly approximated utilizing the embodiments described herein. In particular, the Steiner tree problem may be generalized for cases in which only some of the terminals need to be connected. Consider an example that includes six nodes: S1, T1, S2, T2, S3, T3. The customers utilizing these nodes only request that S1 be connected to T1, that S2 be connected to T2, and that S3 be connected to T3. In this example, other connections between nodes, such as a connection between S1 and S2, are simply not necessary.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1B:
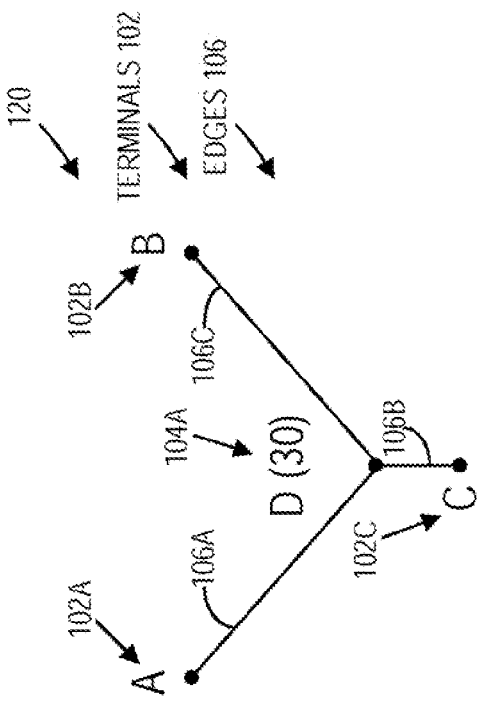
FIG. 1B is a diagram of a network of terminals generated from the graph of FIG. 1A, in accordance with exemplary embodiments.
Figure 1A:
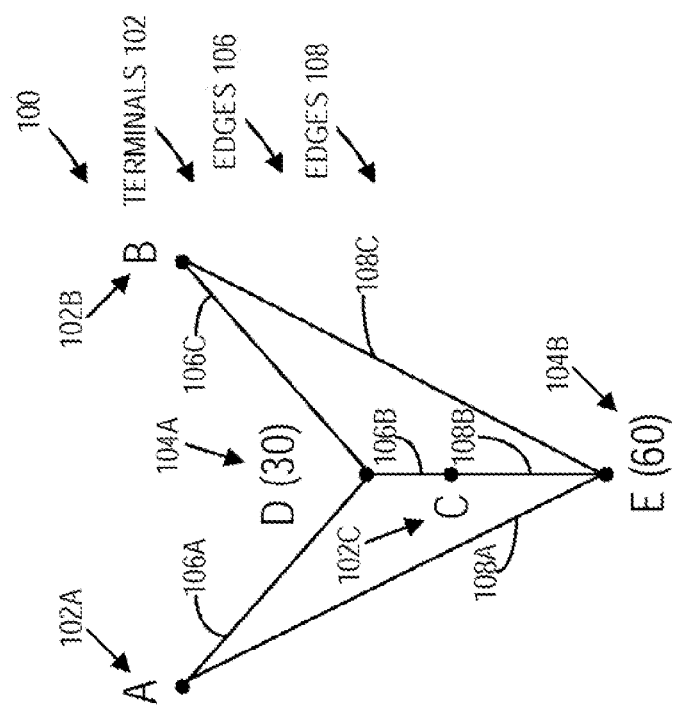
FIG. 1A is a diagram of a graph including nodes and edges connecting the nodes, in accordance with exemplary embodiments.

In the following detailed description, references are made to the accompanying drawings that form a part hereof, and which are shown by way of illustration, using specific embodiments or examples. Referring now to the drawings, in which like numerals represent like elements through the several figures, aspects of a computing system and methodology for approximating a network of terminals will be described. FIG. 1A shows an illustrative graph 100 containing a plurality of nodes, including terminals 102A, 102B, 102C (collectively referred to as terminals 102) and non-terminal nodes 104A, 104B. FIG. 1B shows a network 120 of the terminals 102 that is approximated according to a method, such as a method 300 of FIG. 3, described herein, in accordance with exemplary embodiments. The method 300 is described in greater detail below with respect to FIG. 3. Referring now to FIG. 1A, in the graph 100, the terminals 102 are connected to the node 104A by way of edges 106A, 106B, 106C (collectively referred to as edges 106). The terminals 102 are also connected to the node 104B by way of edges 108A, 108B, 108C (collectively referred to as edges 108). One or more of the nodes 102, 104A, 104B may be associated with a weight. As illustrated in FIG. 1, the node 104A is associated with a weight of thirty, and the node 104B is associated with a weight of sixty.

Conceptually, the weights of the nodes 104A, 104B can be considered a monetary cost. For example, if the nodes 104A, 104B are routers, then purchasing and/or operating the routers may incur a monetary cost. In the example of FIG. 1A, acquiring the node 104A requires thirty units, and acquiring the node 104B requires sixty units. In order to acquire either the node 104A or the node 104B, each of the terminals 102 can be represented as a ball of zero radius, indicating that each of the terminals 102 initially has zero units to spend. According to embodiments, the radius of the balls representing the terminals 102 can be incremented by a given amount of units. For example, if the radiuses of the balls representing the terminals 102 are incremented by one unit, then each of the terminals 102 has a value of one unit. Multiplying the value of one unit by the three terminals 102 yields a total value of three units. However, three units is an insufficient amount to acquire either the node 104A or the node 104B.

The radiuses of the balls representing the terminals 102 can be continually incremented by one until a sufficient amount is reached to acquire a relevant node. As used herein, a relevant node refers to a node of minimum cost that connects two or more of the terminals 102. Once each of the radiuses of the balls reaches a value of ten units, the total value of the terminals 102 becomes thirty units. Since the cost of the node 104A is thirty units, the terminals 102 now have a sufficient amount to acquire the node 104A. Thus, as illustrated in FIG. 1B, the network 120 of the terminals 102 can be formed that includes the node 104A and the edges 106. In this example, since all of the terminals 102 have been connected, the method does not consider the node 104B that costs more than the node 104A. As a result, a cost savings is realized by choosing the node 104A instead of the node 104B.

Figure 2A:
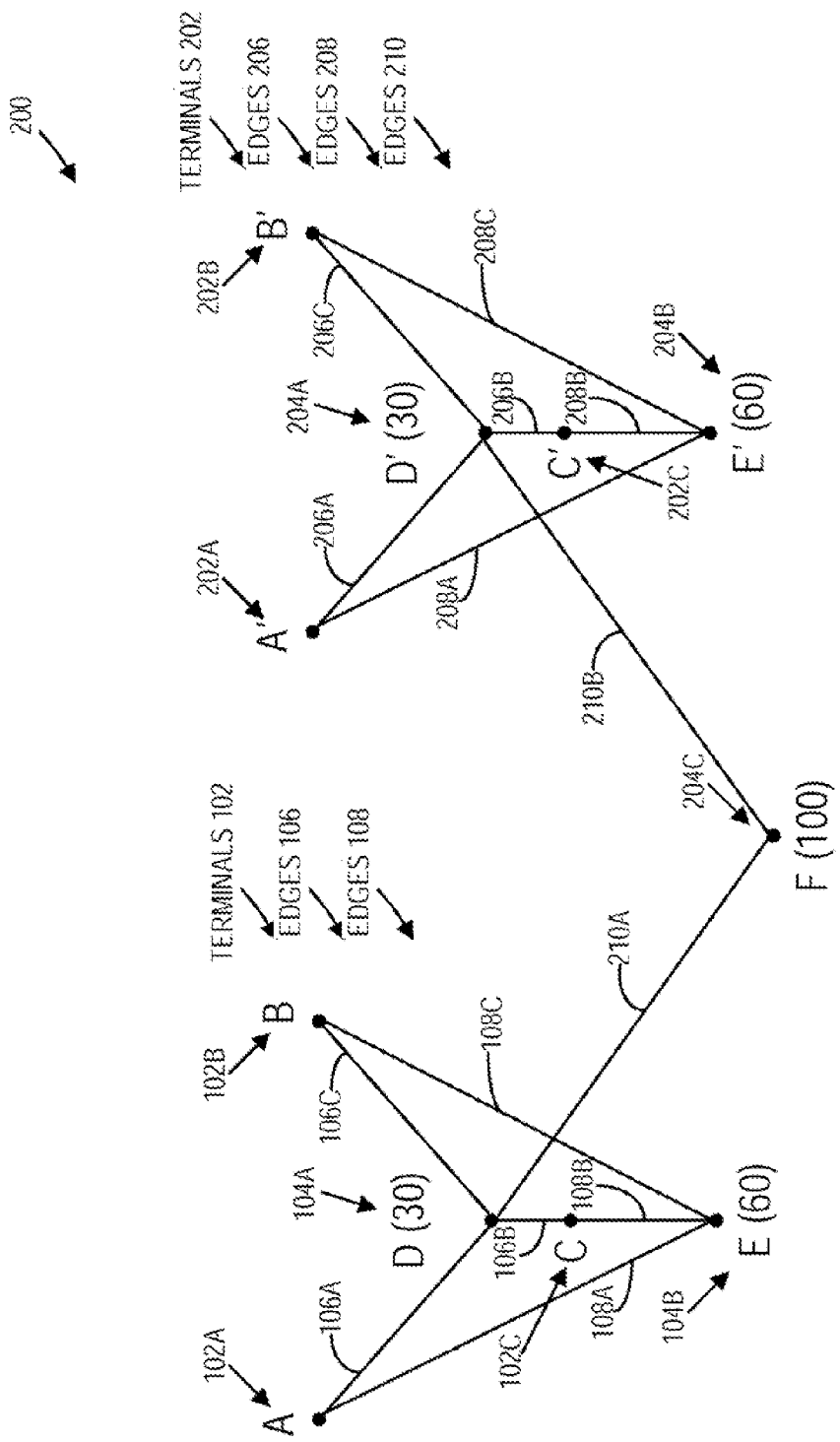
FIG. 2A is a diagram of a graph including nodes and edges connecting the nodes, in accordance with exemplary embodiments.

However, if all of the terminals 102 have not been connected, then the method may continue until all of the terminals 102 have been connected. FIG. 2A shows an illustrative graph 200 that contains the terminals 102, the non-terminal nodes 104A, 104B, and the edges 106, 108 that were included in the graph 100 of FIG. 1A. The graph 200 also contains additional nodes, including terminals 202A, 202B, 202C (collectively referred to as terminals 202) and non-terminal nodes 204A, 204B, 204C. The terminals 202 are connected to the node 204A by way of edges 206A, 206B, 206C (collectively referred to as edges 206). The terminals 202 are also connected to the node 204B by way of edges 208A, 208B, 208C (collectively referred to as edges 208). The node 204C is connected to the nodes 104A, 204A by way of edges 210A, 210B (collectively referred to as edges 210). Similar to the nodes 104A, 104B, the nodes 204A, 204B are also associated with a weight of thirty and sixty, respectively.

Figure 2B:
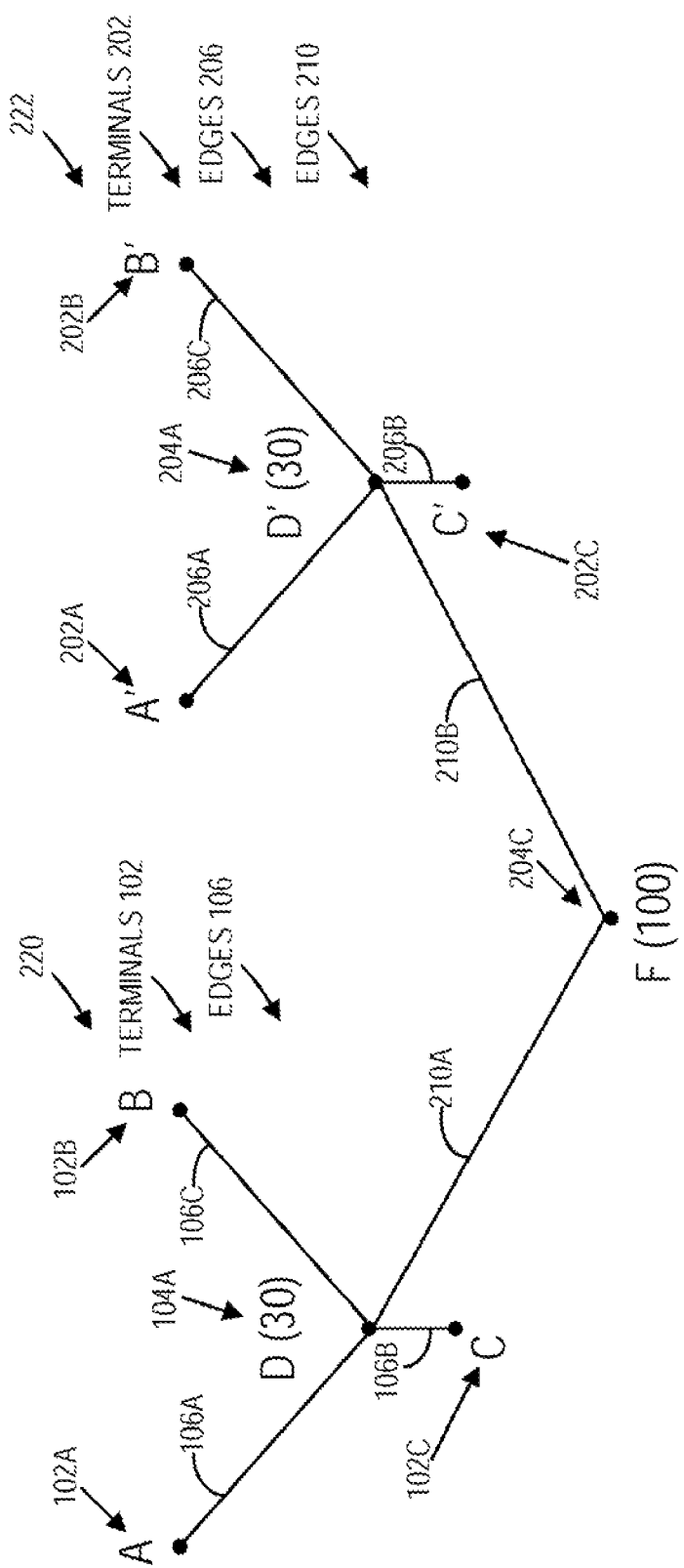
FIG. 2B is a diagram of the graph of FIG. 2A upon connecting a portion of the terminals.

Applying again the method as previously described, each of the terminals 102, 202 are initially represented as balls with a zero radius, indicating that each of the terminals 102 initially has zero units to spend. The radiuses of the balls are then incremented by one or another specified amount until a relevant node can be acquired. Once the radiuses of the balls reaches a value of ten units, the total value of the terminals 102 becomes thirty units, and the total value of the terminals 202 also becomes thirty units. Since the cost of the nodes 104A, 204A is each thirty units, the terminals 102, 202 now have a sufficient amount to acquire the nodes 104A, 204A, respectively. Thus, as illustrated in FIG. 2B, a network 220 of the terminals 102 can be formed that includes the node 104A and the edges 106. Similarly, a network 222 of the terminals 202 can be formed that includes the node 204A and the edges 206.

In this example, the terminals 102A and 102B have been connected, and the terminals 202A and 202B have also been connected. However, the terminals 102 have yet to be connected to the terminals 202. As such, the method continues. In particular, the network 220 forms a connected component that can be collapsed into a super-node 230A as illustrated in FIG.

2C. Similarly, the network 222 also forms a connected component that can be collapsed into a super-node 230B as illustrated in FIG. 2C.

The super-nodes 230A, 230B (collectively referred to as super-nodes 230) are treated as terminals and, as such, are also represented as balls with a zero radius. The radiuses of the balls are then incremented by a specified amount until a relevant node can be acquired. Once each of the radiuses of the balls reaches a value of fifty units, the total of the super-nodes 230 becomes 100 units. Since the cost of the node 204C is each 100 units, the super-nodes 230 now have a sufficient amount to acquire the node 204C. Thus, as illustrated in FIG. 2C, a network 240 of the super-nodes 230 can be formed that includes the node 204C and the edges 210. In this example, all of the terminals 102, 202 have now been connected. However, if all of the terminals 102, 202 have not been connected, then the network 240 may form a connected component that can be collapsed into another super-node, thereby continuing the method as previously described.

According to embodiments, the method may continue by verifying that a minimum number of the non-terminal nodes 104A, 204A, 204C have been acquired. In particular, a later-acquired node may connect the same terminals that are connected by a previously-acquired node. If a later-acquired node is determined to connect the same terminals that are connected by a previously-acquired node, then the previously-acquired node can be safely discarded as being redundant. For example, if the node 204C also connects the terminals 102, then the node 104A can be discarded as being redundant. Upon discarding any redundant nodes, the method may return the network of connected terminals, such as the network 240, to any suitable device or requester.

According to embodiments, prior to connecting the terminals 102, 202, a determination can be made whether to connect the terminals 102, 202. In particular, a penalty may be associated with not connecting the terminals 102, 202. For example, in a telecommunications environment, the failure to connect customers may result in a loss of revenue and customer goodwill. Further, a connection importance value indicating the importance of connecting the terminals 102, 202 may also be associated with the terminals 102, 202. If the connection importance value is above a given threshold, then the penalty is not paid, and the terminals 102, 202 are connected under the method as previously described. However, if the connection importance value is below the given threshold, then the penalty is paid, and the terminals 102, 202 are not connected.

According to embodiments, the threshold can be obtained for each of the terminals 102, 202 from the following natural linear program or other suitable method. In the following linear program, $s(x, y)$ denotes the extent to which the pair $(x, y)$ is unsatisfied. Each pair $(x, y) \in P$ that is not connected incurs a penalty $\rho(x, y)$. The variable $\delta(S)$ denotes the set of edges e such that e has exactly one endpoint in a set of nodes S. The variable v represents a node in a set of nodes V. The variable $w(e)$ represents the weight of the edges. The variable $x(v)$ refers to whether the vertex v has been selected. This particular linear program minimizes the combined cost of edges obtained and the penalties incurred according to one embodiment.

$$\text{minimize} \sum_{e \in E} c(v)x(v) + \sum_{(x,y) \in P} s(x, y)\rho(x, y)$$

subject to $$\sum_{v \in \delta(S)} x(v) + s(x, y) \geq 1 \text{ for all } (x, y) \in P$$

and $S \subseteq V$ with $x \in S, y \notin S$, $x(v) \geq 0$ for all $v \in V$, $s(x, y) \geq 0$ for all $(x, y) \in P$.

For each pair $(x, y) \in P$, if $s(x, y) \geq 1/7$ or other value, then the flow between x and y is ignored and a full penalty of $\rho(x, y)$ is incurred, thereby increasing this part of the cost by at most a factor of seven. For each remaining pair $(x, y) \in P$, $s(x, y) \leq 1/7$. Since 6/7 of the flow between x and y are routed, scaling the flow by 7/6 yields a feasible solution.

Figure 3:
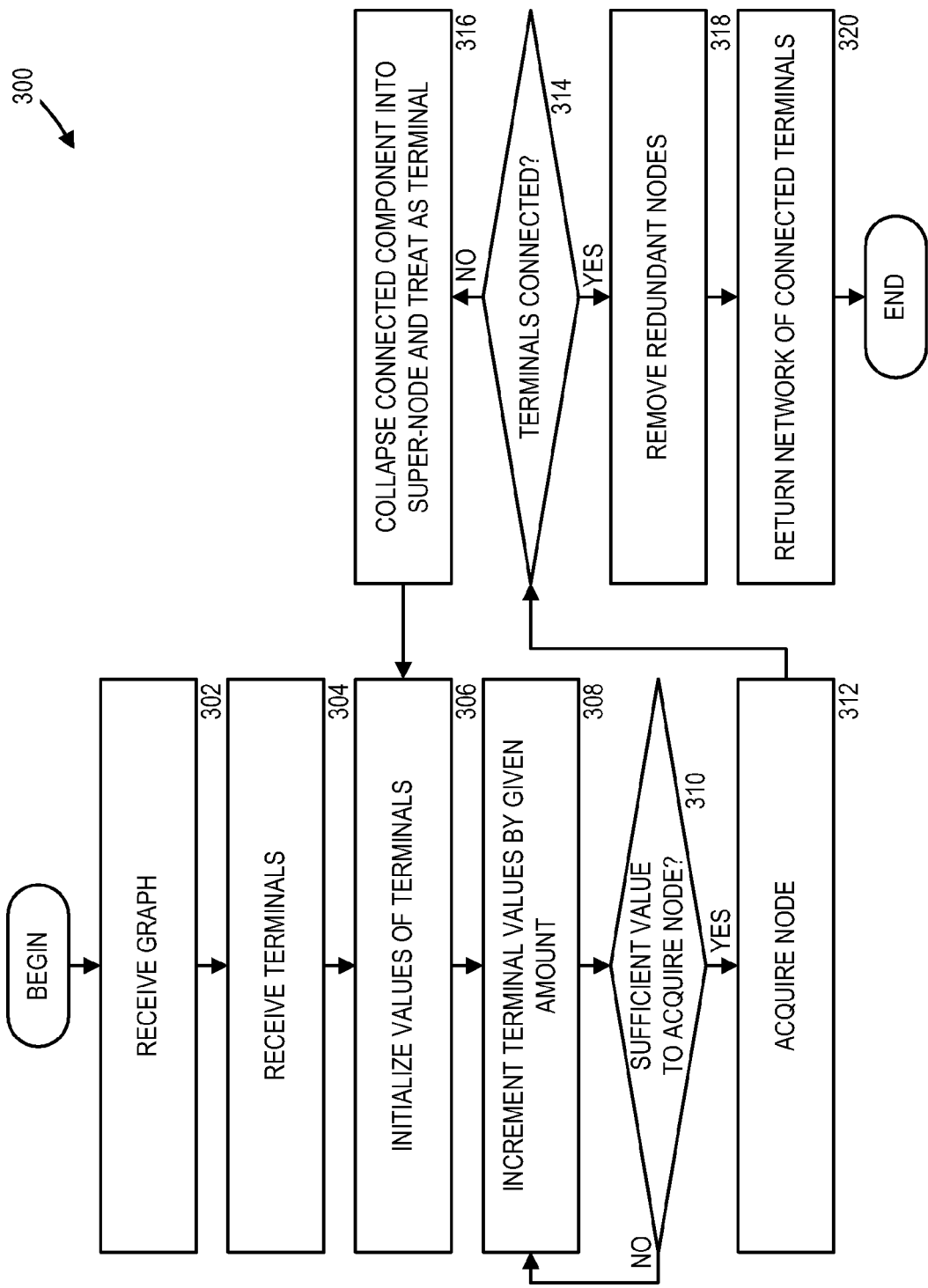
FIG. 3 is a flow diagram illustrating a method for approximating a network of terminals, in accordance with exemplary embodiments.
Figure 4:
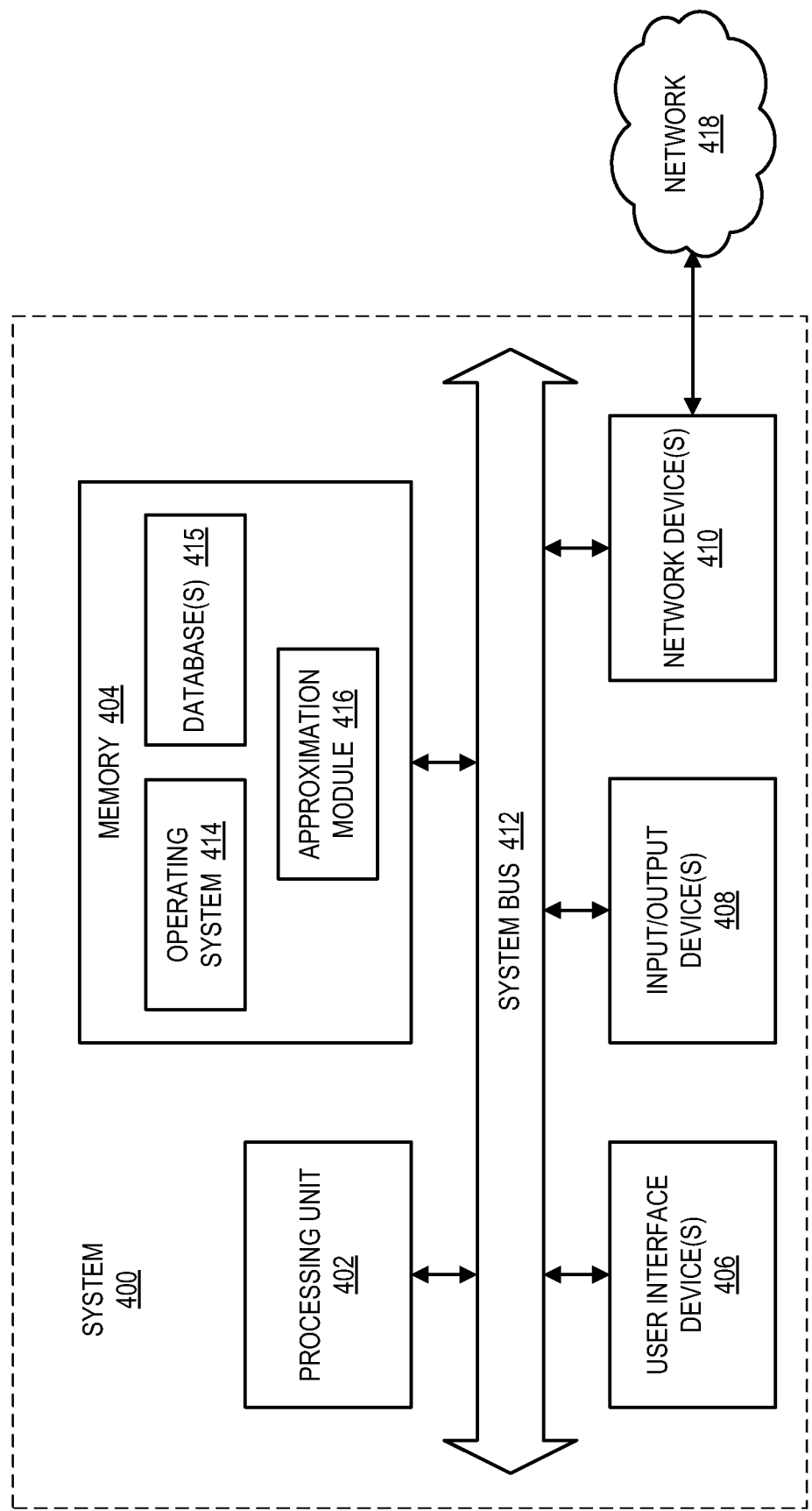
FIG. 4 is a computer architecture diagram showing aspects of an illustrative computer hardware architecture for a com-

FIG. 3 is a flow diagram illustrating the method 300 for approximating a network of terminals, in accordance with exemplary embodiments. The method 300 may be embodied in hardware, software, firmware, or combinations thereof. In one embodiment, the method 300 is embodied in an approximation module 416 as illustrated in FIG. 4. According to the method 300, the approximation module 416 receives (at 302) a graph, such as the graphs 100, 200. The graph contains a plurality of nodes, such as the nodes 102, 104A, 104B, 104C, connected by a plurality of edges, such as the edges 106, 108, 206, 208, 210. In addition to receiving the graph, the approximation module 416 also receives (at 304) terminals, such as the terminals 102, 202, for which a network, such as the networks 120, 220, 222, 240, is approximated.

Upon receiving the graph and the terminals, the approximation module 416 initializes (at 306) the values of the terminals. In one embodiment, the values of the terminals are initialized to zero. As previously described, each of the terminals can be represented as a ball of zero radius, indicating that the terminals have zero units to spend. In other embodiments, the values of the terminals may be initialized to any suitable value.

The approximation module 416 then increments (at 308) the values of the terminals by a given amount. For example, the approximation module 416 may increment the values of the terminals by one. The approximation module 416 then determines (at 310) whether the values of the terminals are sufficient in order to acquire a relevant node. As used herein, a relevant node refers a node of minimum cost that connects two or more of the terminals. If the approximation module 416 determines that the values of the terminals are not sufficient, then the approximation module 416 continues to increment (at 308) the values of the terminals by the given amount.

If the approximation module 416 determines that the values of the terminals are sufficient, then the approximation module 416 acquires (at 312) the relevant node. Upon acquiring the relevant node, a connected component containing the relevant node, the connected terminals, and the associated edges is formed. The approximation module 416 then determines (at 314) whether all of the terminals have been connected. If the approximation module 416 determines that not all of the terminals are connected, then the approximation module 416 collapses (at 316) the connected component into a super-node, such as the super-nodes 230, and treats the super-node as another terminal. Upon collapsing the connected component into the super-node, the approximation module 416 initializes (at 306) the terminals and repeats the operations at 308, 310, 312, 314, and 316 as necessary.

If the approximation module 416 determines that all of the terminals are connected, then the approximation module 416 removes (at 318) any redundant nodes. In one embodiment, the approximation module 416 reverses the order in which the nodes were acquired and determines whether each of the acquired nodes can be removed. In particular, if a previously-acquired node connects the same terminals that are connected by a later-acquired node, then the previously-acquired node can be safely discarded as being redundant. Upon removing any redundant nodes, the approximation module 416 returns (at 320) the network of connected terminals to any suitable device or requester.

The method 300 as previously described can also be defined under the following notation. Let V be the set of nodes in an undirected graph G. The variable $\delta(S)$ denotes the set of edges e such that e has exactly one endpoint in a set of nodes S. The variable X initially includes all nodes v in V such that $f(\{v\})=1$, and these elements are not removed from X. The oracle Viol(.) takes as input a partial solution X and outputs a family of sets S of nodes for which $f(S)=1$ (though not all such sets). For a subset X of nodes, let CC(X) denote the connected components of the subgraph of G induced by X. The variable $c(v)$ represents the cost of the vertex v. The variable $f(\{v\})$ is the value of the function $f$ for a set which contains only vertex v, where $\{v\}$ is a set which contains only vertex v. The variable $y_s$ is the radius of the ball corresponding to set S.

Recall that the dual linear program has a constraint $\Sigma_{S \subseteq V: v \in \delta(S)} y_s \leq c(v)$ for each node $v \in V$.

1. $y \leftarrow 0$
2. $X \leftarrow \{v: f(\{v\})=1\}$
3. While $f(S)=1$ for some connected component $S \in CC(X)$:
   (a) For all sets $S \in Viol(X)$, increase $y_s$ uniformly until the dual linear program ("LP") inequality for some v becomes tight: $\Sigma_{S \subseteq V: v \in \delta(S)} y_s = c(v)$.
   (b) Add v to X, i.e., $x(v) \leftarrow 1$
4. For each v in X in the reverse order form which each v was added during the while-loop: If $f(S)=0$ for every connected component $S \in CC(X-\{v\})$, the remove v from X, i.e., $x(v) \leftarrow 0$.
5. Return X.

FIG. 4 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 4 is a block diagram illustrating a system 400 operative to approximate a network of terminals, in accordance with exemplary embodiments. The system 400 includes a processing unit 402, a memory 404, one or more user interface devices 406, one or more input/output ("I/O") devices 408, and one or more network devices 410, each of which is operatively connected to a system bus 412. The bus 412 enables bi-directional communication between the processing unit 402, the memory 404, the user interface devices 406, the I/O devices 408, and the network devices 410. Examples of the system 400 include, but are not limited to, computers, servers, personal digital assistants, cellular phones, or any suitable computing devices.

The processing unit 402 may be a standard central processor that performs arithmetic and logical operations, a more specific purpose programmable logic controller ("PLC"), a programmable gate array, or other type of processor known to those skilled in the art and suitable for controlling the operation of the computer system. Processing units are well-known in the art, and therefore not described in further detail herein.

The memory 404 communicates with the processing unit 402 via the system bus 412. In one embodiment, the memory 404 is operatively connected to a memory controller (not shown) that enables communication with the processing unit 402 via the system bus 412. The memory 404 includes an operating system 414, one or more databases 415, and the approximation module 416, according to exemplary embodiments. As previously described, the method 300 for approximating a network of terminals as described above with respect to FIG. 3 may be embodied as or executed by the approximation module 416. Examples of operating systems, such as the operating system 414, include, but are not limited to, WINDOWS and WINDOWS MOBILE operating systems from MICROSOFT CORPORATION, MAC OS operating system from APPLE CORPORATION, LINUX operating system, SYMBIAN OS from SYMBIAN SOFTWARE LIMITED, BREW from QUALCOMM INCORPORATED, and FREEBSD operating system.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the system 400.

The user interface devices 406 may include one or more devices with which a user accesses the system 400. The user interface devices 406 may include, but are not limited to, computers, servers, personal digital assistants, cellular phones, or any suitable computing devices. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer.

The network devices 410 enable the system 400 to communicate with other networks or remote systems via a network 418. Examples of network devices 410 may include, but are not limited to, a modem, a radio frequency ("RF") or infrared ("IR") transceiver, a telephonic interface, a bridge, a router, or a network card. The network 418 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 418 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the scope of the embodiments, which is set forth in the following claims.

What is claimed is:

1. A method for approximating a network of terminals, comprising:
   receiving a graph comprising nodes and edges connecting at least some of the nodes, the nodes comprising terminals and non-terminal nodes, each of the non-terminal nodes being associated with a weight;
   initializing each of the terminals to a value;
   incrementing the values of the terminals by a given amount until the values of the terminals reach a sufficient amount to acquire at least one of the non-terminal nodes that connects at least two of the terminals based on the weight of the at least one of the non-terminal nodes;
   upon the values of the terminals reaching the sufficient amount, acquiring the at least one of the non-terminal nodes and the edges connecting the at least one of the non-terminal nodes to the at least two of the terminals to form a connected component in the network of terminals;
   determining whether all of the terminals are connected;
   upon determining that all of the terminals are connected, removing any redundant nodes from the acquired non-terminal nodes in the network of terminals; and
   upon the removing any redundant nodes, returning the network of terminals.

2. The method of claim 1, wherein the removing any redundant nodes from the acquired non-terminal nodes in the network of terminals comprises:
   determining whether a later-acquired non-terminal node connects the same terminals as a previously-acquired non-terminal node; and
   upon determining that the later-acquired non-terminal node connects the same terminals as the previously-acquired non-terminal node, removing the previously-acquired non-terminal node.

3. The method of claim 1, further comprising:
   determining whether all of the terminals are connected;
   upon determining that all of the terminals are not connected, collapsing the connected component into a super-node; and
   repeating the operations of the initializing, incrementing, and acquiring based on treating the super-node as another terminal node.

4. The method of claim 1, wherein the network of terminals comprises a node-weighted Steiner tree.

5. The method of claim 1, wherein the graph comprises a planar graph.

6. The method of claim 1, wherein the initializing each of the terminals to a value comprises assigning to each of the terminals the value of zero.

7. A system for approximating a network of terminals, comprising:
   a memory for storing a program for approximating the network of terminals; and
   a processor functionally coupled to the memory, the processor being responsive to computer-executable instructions contained in the program and operative to:
      receive a graph comprising nodes and edges connecting at least some of the nodes, the nodes comprising terminals and non-terminal nodes, each of the non-terminal nodes being associated with a weight,
      initialize each of the terminals to a value,
      increment the values of the terminals by a given amount until the values of the terminals reach a sufficient amount to acquire at least one of the non-terminal nodes that connects at least two of the terminals based on the weight of the at least one of the non-terminal nodes,
      upon the values of the terminals reaching the sufficient amount, acquire the at least one of the non-terminal nodes and the edges connecting the at least one of the non-terminal nodes to the at least two of the terminals to form a connected component in the network of terminals,
      determine whether all of the terminals are connected,
      upon determining that all of the terminals are connected, remove any redundant nodes from the acquired non-terminal nodes in the network of terminals, and
      upon the removing any redundant nodes, return the network of terminals.

8. The system of claim 7, wherein to removing the any redundant nodes from the acquired non-terminal nodes in the network of terminals, the processor is further operative to:
   determine whether a later-acquired non-terminal node connects the same terminals as a previously-acquired non-terminal node; and
   upon determining that the later-acquired non-terminal node connects the same terminals as the previously-acquired non-terminal node, remove the previously-acquired non-terminal node.

9. The system of claim 7, the processor being responsive to further computer-executable instructions contained in the program and operative to:
   determine whether all of the terminals are connected;
   upon determining that all of the terminals are not connected, collapse the connected component into a super-node; and
   repeat the operations of the initializing, incrementing, and acquiring based on treating the super-node as another terminal node.

10. The system of claim 7, wherein the network of terminals comprises a node-weighted Steiner tree.

11. The system of claim 7, wherein the graph comprises a planar graph.

12. A non-transitory, tangible computer-readable storage medium having instructions stored thereon for execution by a processor to provide a method for approximating a network of terminals, the method comprising:
- receiving a graph comprising nodes and edges connecting at least some of the nodes, the nodes comprising terminals and non-terminal nodes, each of the non-terminal nodes being associated with a weight;
- initializing each of the terminals to a value;
- incrementing the values of the terminals by a given amount until the values of the terminals reach a sufficient amount to acquire at least one of the non-terminal nodes that connects at least two of the terminals based on the weight of the at least one of the non-terminal nodes;
- upon the values of the terminals reaching the sufficient amount, acquiring the at least one of the non-terminal nodes and the edges connecting the at least one of the non-terminal nodes to the at least two of the terminals to form a connected component in the network of terminals;
- determining whether all of the terminals are connected;
- upon determining that all of the terminals are connected, removing any redundant nodes from the acquired non-terminal nodes in the network of terminals; and
- upon the removing any redundant nodes, returning the network of terminals.

13. The computer-readable storage medium of claim 12, wherein the removing any redundant nodes from the acquired non-terminal nodes in the network of terminals comprises:
- determining whether a later-acquired non-terminal node connects the same terminals as a previously-acquired non-terminal node; and
- upon determining that the later-acquired non-terminal node connects the same terminals as the previously-acquired non-terminal node, removing the previously-acquired non-terminal node.

14. The computer-readable storage medium of claim 12, the method further comprising:
- determining whether all of the terminals are connected;
- upon determining that all of the terminals are not connected, collapsing the connected component into a super-node; and
- repeating the operations of the initializing, incrementing, and acquiring based on treating the super-node as another terminal node.

15. The computer-readable storage medium of claim 12, wherein the network of terminals comprises a node-weighted Steiner tree.

16. The computer-readable storage medium of claim 12, wherein the graph comprises a planar graph.

17. The computer-readable storage medium of claim 12, wherein the initializing each of the terminals to a value comprises assigning to each of the terminals a value of zero.

* * * * *